United States Patent [19]

Maxon, III

[11] 4,058,343

[45] Nov. 15, 1977

[54] CONCRETE TRANSPORTING AND PLACING VEHICLE WITH LATERALLY SHIFTABLE BODY

[75] Inventor: Glenway W. Maxon, III, Milwaukee, Wis.

[73] Assignee: Maxon Industries, Inc., Milwaukee, Wis.

[21] Appl. No.: 762,242

[22] Filed: Jan. 25, 1977

[51] Int. Cl.² .............................................. B60P 1/30
[52] U.S. Cl. .................................... 298/9; 296/28 D; 298/7; 298/18; 298/22 R
[58] Field of Search ....................... 298/7, 9, 13, 17.7, 298/22 R, 17.6, 18, 14, 1 R, 17 R; 214/501, 505; 296/28 D

[56] References Cited

U.S. PATENT DOCUMENTS

| | | | |
|---|---|---|---|
| 1,970,627 | 8/1934 | Rubini et al. | 298/9 |
| 2,880,977 | 4/1959 | Maxon, Jr. | 298/7 X |
| 3,038,704 | 6/1962 | Cook | 298/14 X |
| 3,695,709 | 10/1972 | Reinhardt | 298/9 |

Primary Examiner—Frank E. Werner
Attorney, Agent, or Firm—Ira Milton Jones & Associates

[57] ABSTRACT

A concrete transporting and placing vehicle wherein the frame of the material receiving body is slidably seated on a sub-frame that is fixed to the chassis of a truck, for movement by a hydraulic cylinder, about a fixed vertical axis, either to the left or the right, from a centered transport position aligned with the truck chassis to a diagonal discharge position in which the material discharge mouth at the rear of the body is at one side or the other of the vehicle; depending upon whether the body frame was shifted to the left or the right; and wherein upon return of the body frame to its transport position, a locking pin automatically engages to releasably hold the body frame in its transport position, the locking pin being automatically retracted to release the body frame for movement from its transport position, concomitantly with pressurization of the cylinder to effect such movement.

11 Claims, 10 Drawing Figures

CONCRETE TRANSPORTING AND PLACING VEHICLE WITH LATERALLY SHIFTABLE BODY

This invention relates to concrete transporting or hauling vehicles, by which freshly mixed concrete is carried from a central mixing plant to a point of use.

Since the advent of the central mixing plant, quite a number of different concrete hauling units have been devised, all of which have one thing in common — a body to contain the concrete, mounted on a truck or other transport vehicle, and some way of effecting controlled discharge of the material from the body. Usually the vehicle has been equipped with a chute to receive the concrete issuing from the discharge mouth of the body and to convey it to a selected spot. For obvious reasons, a unit that does not commit the contractor to an excessive capital investment and that enables him to deliver the maximum pay-load and place that load where it is wanted in the least possible time with the least manpower, has been an objective and goal towards which the industry has been striving for years.

The closest any prior unit has come to meeting that objective is no doubt the Agitor concrete carrier of the Maxon, Jr. U.S. Pat. No. 2,880,977 and the earlier Maxon, Jr. U.S. Pat. No. 2,465,899. In those units, a somewhat funnel-shaped body with a capacity of as much as ten cubic yards for some models, is mounted on the chassis of a conventional truck in a manner enabling the same to be raised and tilted about an elevated transverse axis located at the rear of the chassis and close to the discharge mouth of the body. While this design provides a desirably high initial discharge point from which to chute the concrete, the fact that the discharge mouth is on the centerline of the truck chassis detracts considerably from that advantage when it is necessary to deliver the concrete to a zone spaced laterally to one side of the truck. That necessity is encountered whenever the truck cannot be backed into place but must be parallel to the forms into which the concrete is to be poured. With the truck thus positioned, the concrete issuing from the discharge mouth of the body must be chuted four feet (half the width of the truck) before it reaches the side of the truck. In traveling that distance, much of the advantage of the high discharge point is lost, with the result that the chuting distance is significantly restricted.

The aforesaid disadvantage of the rear discharge Agitor type concrete carriers is avoided by the so-called side-dump machines like that of the Maxon, Jr. U.S. Pat. No. 3,236,562. In those units, the axis about which the body tilts is fixedly parallel to the sides of the truck and lies in a vertical plane close to one side of the truck; and while this disposition of the body increases the distance the concrete can be chuted to one side of the vehicle, the inability of the unit to discharge to the rear of the truck robs it of versatility and makes it entirely impracticable for many applications.

The obvious answer to the dilemma that resulted from the constraints inherent in the rear discharge Agitor-type concrete hauling units and the fixed side-dump machines is, of course, to mount the body on a turntable. That expedient is disclosed in the 1944 Golay Pat. No. 2,358,224 (FIG. 9) and also constitutes the substance of the Winfrey II U.S. Pat. No. 3,606,278. But mounting the body on a turntable results in a complex and expensive machine that is difficult to build, puts high stresses on the truck frame, and seriously raises the height of the center of gravity of the machine. For these reasons — and perhaps others — as, for instance, the incompatibility between the roller bearings of a turntable and the abrasive environment in which concrete handling equipment must operate, turntable mounted concrete hauling machines have not met with favor.

With a view to eliminating the objections and limitations of concrete transporting and placing vehicles heretofore available, the present invention has as its purpose and object the provision of a material transporting vehicle especially well adapted for hauling and placing concrete, which has all of the advantageous features of prior concrete hauling and placing machines, but none of their disadvantages.

To be more specific, the object of this invention is the attainment of a concrete transporting and placing vehicle which does not entail an objectionably serious capital investment, and can carry a sizable load and discharge that load from a desirably high elevation; but — unlike the Agitor — does not waste any of that valuable height in chuting the discharging concrete to the point of placement when conditions require that it be directed laterally away from the side of the vehicle. In this respect, the invention has the advantage of the so-called side-dump concrete hauling vehicles, but unlike those machines, with this invention it is also possible to discharge the material rearwardly — a versatility the side-dump vehicles do not possess.

Hence, the invention utilizes the advantages of the turret-mounted concrete carrier, but — unlike the turret-mounted machines — it is not saddled with the objectionable characteristics of turret-mounted machines.

The invention achieves this remarkable improvement over the material transporting and placing vehicles heretofore available by interposing a structurally novel sub-frame between the vehicle chassis and the body frame, the sub-frame being fixed to the chassis; and the body frame with the body tiltably mounted thereon, being pivoted to the sub-frame to swing about a vertical axis from a centered position longitudinally in line with the chassis to either a left or right diagonally disposed position. The invention thus utilizes the advantage of a turret mounted body, but by virtue of the design and construction of the sub-frame, the problems inherent in the use of a turntable are avoided, and reliable stability is assured during shifting of the body frame to and from its centered position and during elevation of the body to discharge its contents. That desirable and very important stability, to a large extent, stems from the fact that in all positions to which the body can be swung, its center of gravity remains close to the vertical axis about which it swings; and, during elevation of the body to discharge its contents, that center of gravity moves very little — if at all — from the longitudinal center of the body frame.

A feature indicative of the reliable simplicity that characterizes this invention is the use of a single hydraulic cylinder and ram to swing the body frame either to the left or right from its centered position, and in the manner in which that hydraulic motor is employed.

Another feature of the invention that evidences its advance over the prior art is the clear view it affords the driver of the truck — without leaving the cab — of the material issuing from the discharge mouth of the vehicle body and entering the chute, when delivering the material to a zone at the side of the truck.

Still another ingenious feature of the invention is the provision of a locking pin that is automatically activated upon return of the body frame to its transport position to hold the same against displacement from that position, and is automatically released as a consequence of initiating activation of the hydraulic motor by which the body is shifted out of its transport position.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate one complete example of the embodiment of the invention, and a modification thereof, constructed according to the best mode so far devised for the practical application of the principles thereof, and in which.

Referring to the accompanying drawings, the numeral 5 designates a conventional truck having a chassis 6 that extends rearwardly of its cab 7 and is supported at the rear by a wheel assembly 8. As is customary, the chassis 6 has interconnected parallel side rails 9 that lie between the rear wheels at a level generally no higher than the top of the wheels.

The load receiving body 10 of the vehicle is mounted on the chassis 6 in a manner that is significantly different from the way in which the body has been mounted in prior concrete hauling and placing vehicles. Although the specific design or shape of the body is subject to choice, the invention is most advantageously applicable to the Agitor type of concrete transporting and placing vehicles, such as those of the aforesaid Maxon, Jr. U.S. Pat. Nos. 2,880,977 and 3,198,495, since those vehicles have an exceptionally high discharge elevation. Accordingly, the body 10 has a frustoconical bottom wall which slopes and tapers generally upwardly and rearwardly and merges into convergent side walls, which — together with the bottom wall — define a discharge mouth 11 at the rear of the body.

To achieve the desired high level discharge, the body is tiltingly supported at its rear end by an upright structure 12 that rises from a substantially rectangular horizontal frame 13 which includes fore and aft elongated rails 14. The specific bearing structure by which the body is tiltably connected to the upright structure 12 has not been shown since it forms no part of this invention. The only important aspect of the connection is that its axis 15 is fixed with respect to the frame 113 and extends transversely across that frame at a substantial distance thereabove; and that this tilt axis is directly below the discharge mouth of the body.

Figure 1:
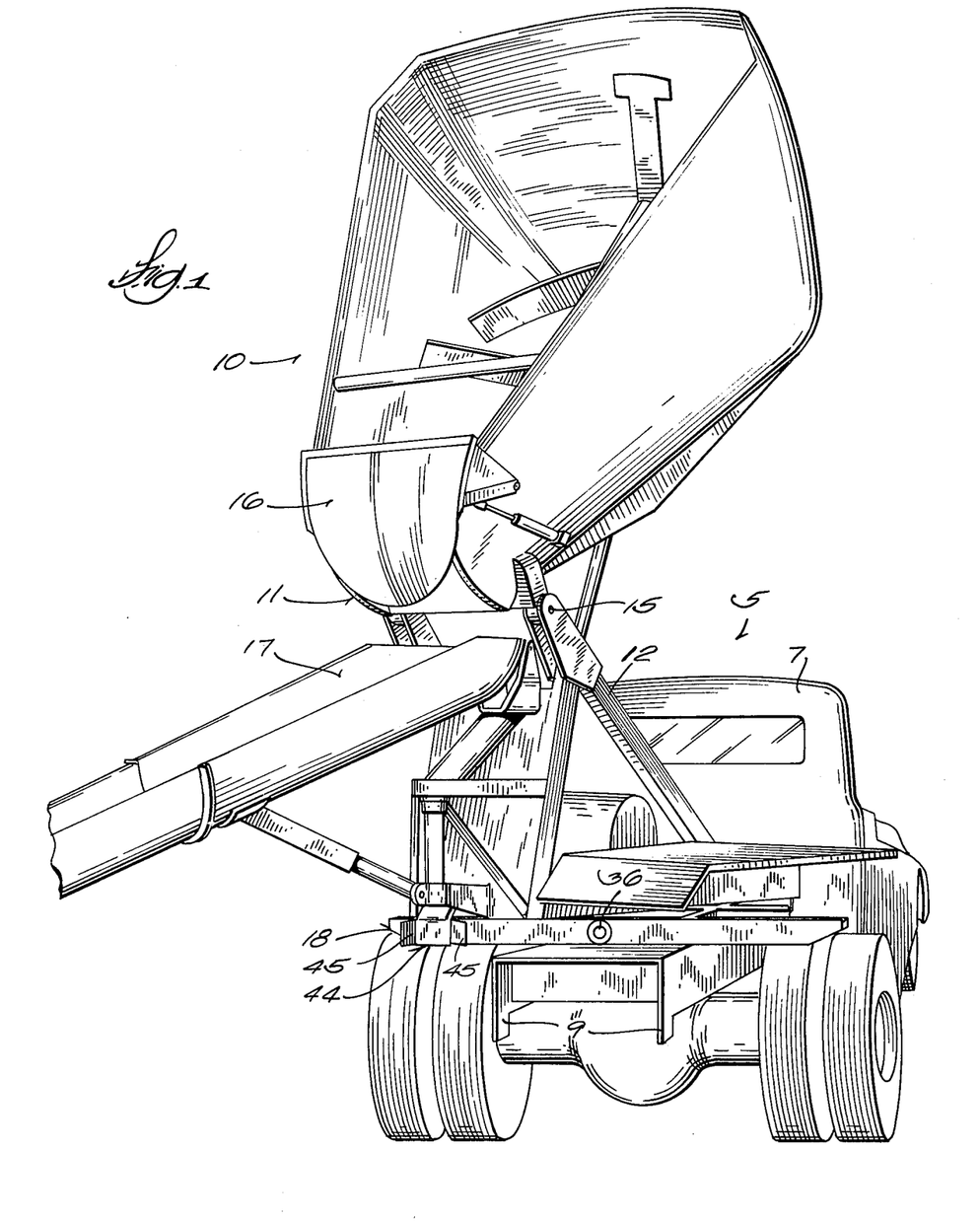
FIG. 1 is a perspective view of a concrete hauling and placing vehicle embodying this invention, showing its body elevated and its discharge chute delivering the concrete being discharged from the body to a placement zone spaced a substantial distance to the left side of the vehicle.
Figure 2:
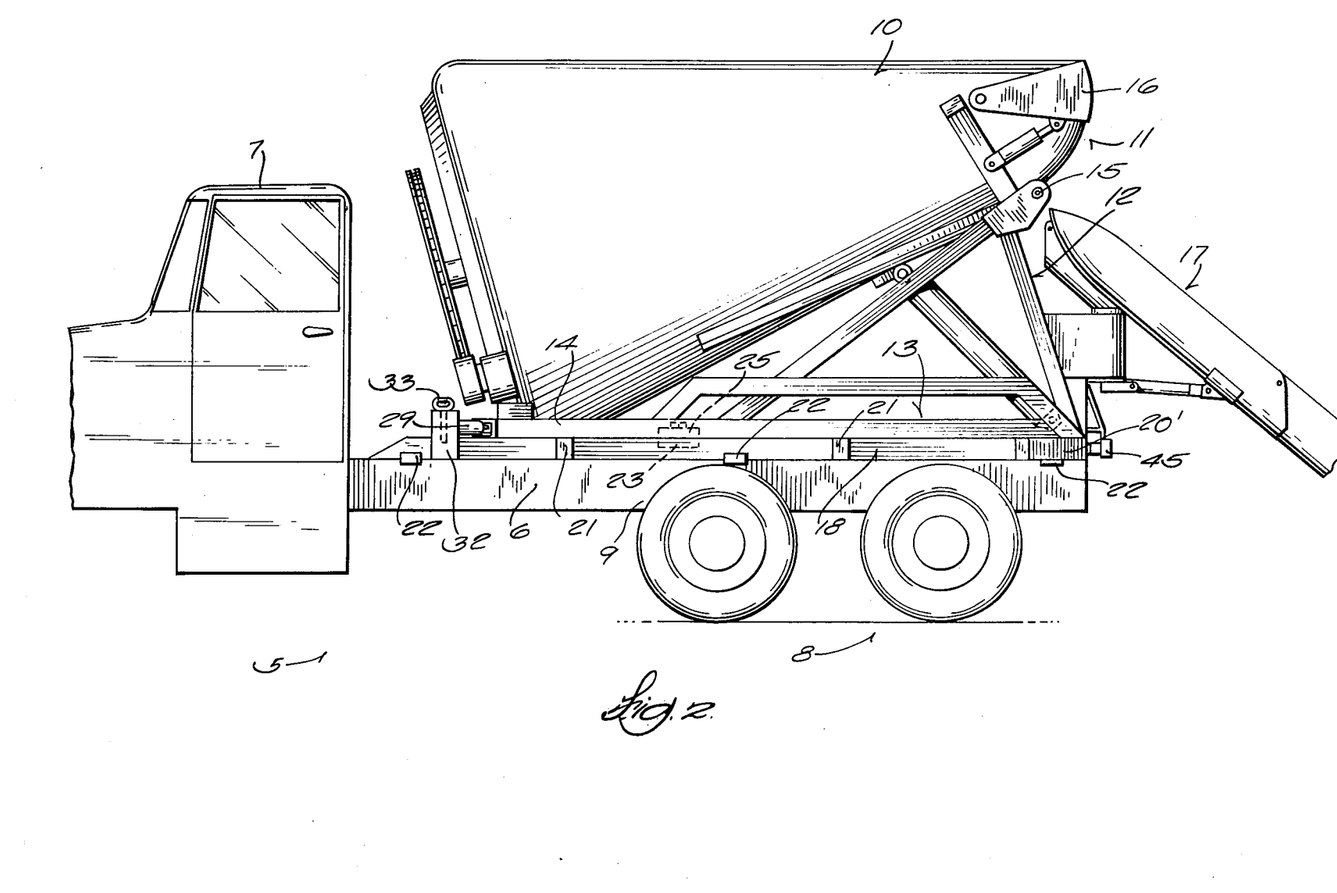
FIG. 2 is a side view of the vehicle with its body lowered and in its transport position.

Suitable hydraulic hoist mechanism lifts the body from its transport position resting on the frame 13 to its elevated discharge position in which it is shown in FIG. 1; and a hinged gate 16, which is controlled by the operator, regulates the discharge of the body contents into the receiving end of a chute 17. As in the aforesaid Maxon, Jr. patents, the chute 17 is mounted on the rear end of the frame 13 for swinging adjustment about a vertical axis. This enables the chute to direct the discharging material in any direction within a range of at least 180°.

In the Agitor-type concrete carriers, the body supporting frame 13 — which, for convenience in terminology, may be regarded as the "body frame" — was fixed to the chassis of the vehicle, specifically to its side rails 9, and hence the vertical axis about which the chute 17 could be swung (as also the discharge mouth of the body) was constrained to a vertical plane coincident with the fore and aft center-line of the vehicle. This constraint greatly limited the sideward distance that concrete could be chuted and also objectionably limited the height of concrete forms that could be accommodated as in the production of pre-stressed structures.

These disadvantages of the prior Agitor-type concrete hauling and placing vehicles are eliminated by interposing a sub-frame 18 of novel design between the body frame 13 and the chassis 6, and by pivotally mounting the body frame on this sub-frame. By this departure from prior practice, the body frame, with the body thereon, can be swung from its transport position, laterally centered on the chassis, to either a left or right diagonal or oblique position, in each of which the discharge mouth of the body and the vertical axis about which the chute 17 swings are significantly spaced from the longitudinal center of the chassis. As a result, the reach of the chute to the side of the vehicle is increased by as much as half the maximum width of the truck, and the height at which concrete leaves the chute when swung to the side of the truck is sufficient to accommodate even relatively high pre-stressed beam forms.

Figure 4:
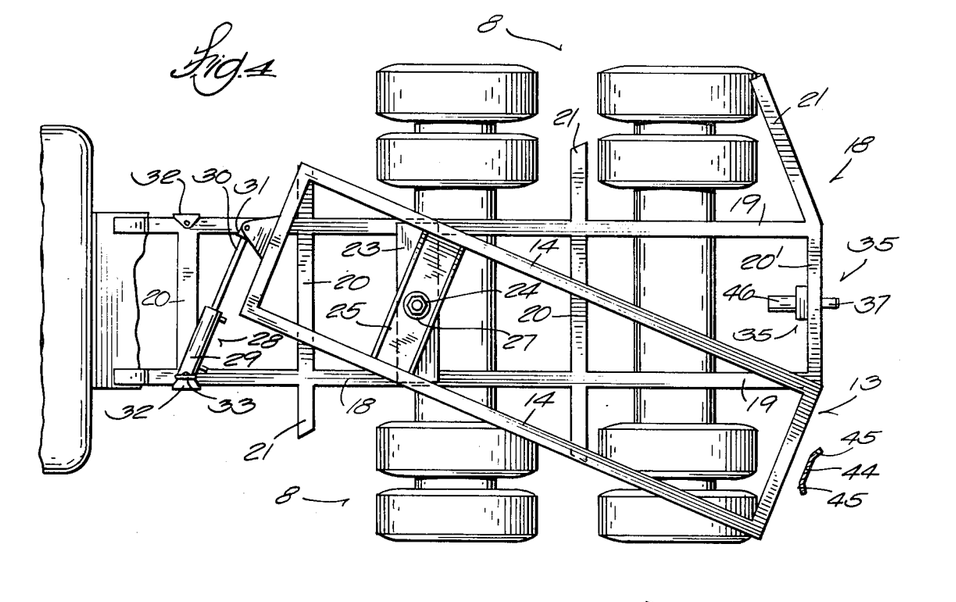
FIG. 4 is a top view of the subframe of the vehicle, with the body frame indicated thereon and swung to its leftward diagonal position.

The sub-frame 18 is fabricated of structural steel, preferably in the form of rectangular tubes. It has parallel side members 19 connected by cross members 20 that are located at spaced intervals along the length of the sub-frame, and cantilevered arms 21 in line with these cross members. All but the rearmost arms project at right angles from the side members. The rearmost arms, as best seen in FIG. 4, are angled forwardly from the adjacent ends of the rearmost cross member 20', to be square with the longitudinal centerline of the body frame when the latter is shifted to its diagonally disposed locations. Preferably the distance the several cantilevered arms project from the parallel side members 19 is such that their ends align with the outer rails 14 of the body frame in its diagonal positions.

The spacing of the side members 19 of the sub-frame corresponds to that of the chassis side rails 6. This enables the sub-frame to be secured to the chassis by conventional mounting clips 22 that are fixed to the outer faces of the sub-frame side members and the chassis side rails. Attention is directed to the fact that when the sub-frame is secured to the chassis, the cantilevered arms 21 of the sub-frame do not interfere with the needed clearance for up and down movement of the rear wheel tires relative to the chassis.

The sub-frame portion of the pivotal connection between the body frame and the sub-frame comprises a rigid beam 23 fixed at its ends to the side members 19 of the sub-frame, and a pivot pin 24 which projects perpendicularly upward from the top face of that beam on the fore and aft centerline of the chassis. Preferably the beam 23 is a channel section and has its flanges directed downwardly so that the top of the beam presents a flat top surface that is coplanar with that of all of the several structural members that form the sub-frame. All parts of the sub-frame thus coact to provide a horizontal platform upon which the body frame sets, it being understood that the bottom surface of all parts of the body frame lie in a common horizontal plane and hence have a surface-to-surface sliding engagement with the sub-frame.

The body-frame portion of the pivotal connection between the two frames is provided by a rigid bridging member 25 that spans the distance between the parallel side rails 14 of the body frame and has its ends fixed thereto. Preferably this bridging member — like the beam 23 — is a channel, but in this case its flanges face upward to enable the outer side of its web to be coplanar with the bottom of the body frame. A bearing 26 fixed to the bridging member 25 with its axis vertical and equispaced from the sides of the body frame, freely rotatably receives the pivot pin 24 and thereby constrains relative motion between the two frames to rotation about the axis of the pin. Preferably a nut 27 is threaded on the upper end of the pivot pin above the bearing 26.

The location of the pivot axis about which the body frame swings in moving from its centered transport position to either of its diagonally disposed locations is of utmost importance. It must be so located lengthwise of the body frame that it either passes through the center of gravity of the loaded body when the latter is in its lowered transport position, or very nearly does so. With that positional relationship established, though the center of gravity of the loaded body may shift somewhat along the longitudinal centerline of the body as the body is elevated, it does not move any appreciable distance closer to either side of the chassis.

Figure 3:
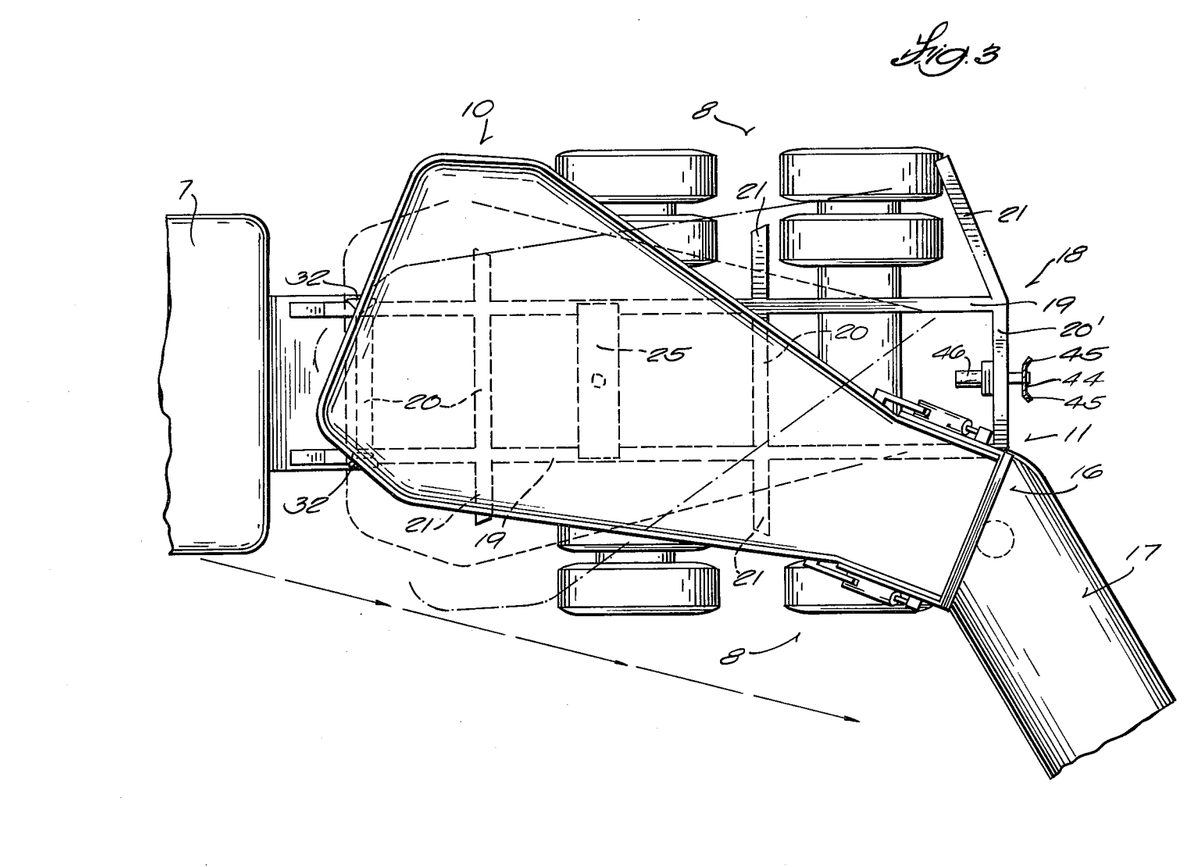
FIG. 3 is a top view of the vehicle with its body swung to its leftward diagonal position, as in FIG. 1, and in dotted lines showing the body in its transport position and also swung to its rightward diagonal position.

Attention is directed to the fact that, as indicated in FIG. 3, the driver of the truck has a clear view from the cab, of the discharge end of the chute.

Figure 5:
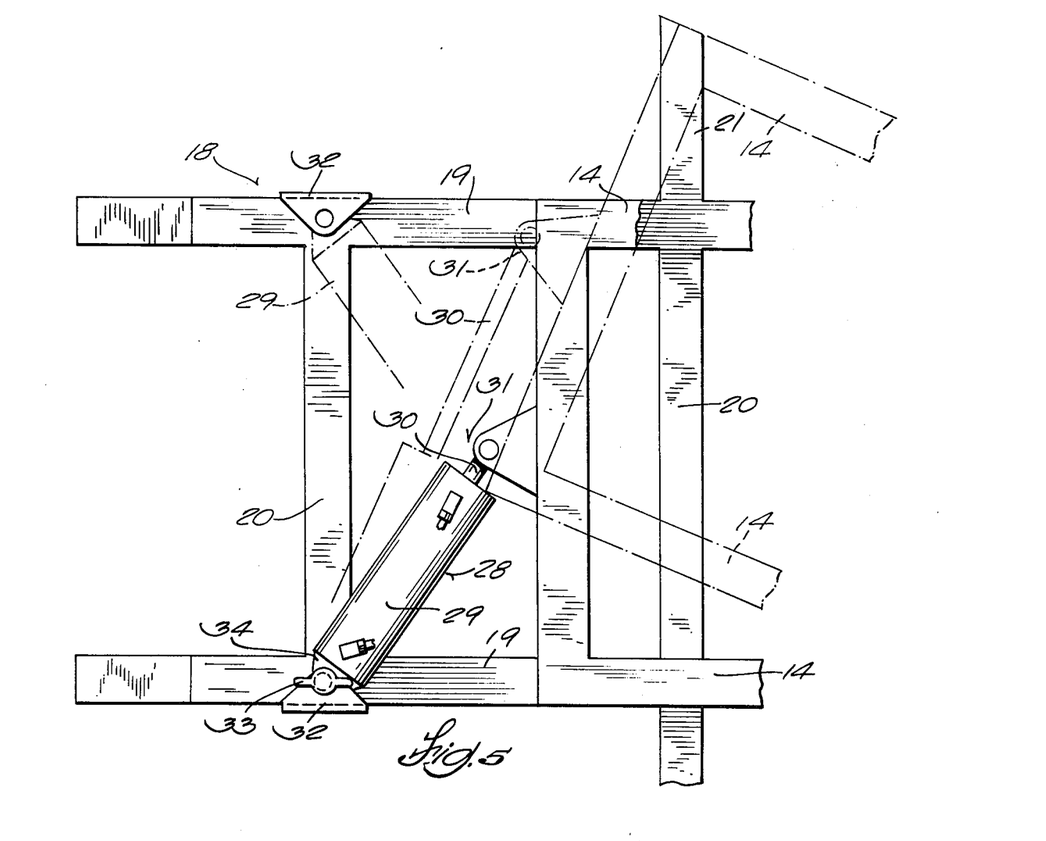
FIG. 5 is a detail top view of the front end portion of FIG. 4, to show both locations of the hydraulic cylinder by which the body frame is slid across the sub-frame from one position to another.

The body frame is swung about its pivotal connection with the sub-frame by operator-controlled activation of a double acting hydraulic motor 28 located at the front end of the sub-frame. As best shown in FIGS. 4 and 5, the cylinder 29 of the hydraulic motor is pivotally connected to the sub-frame and its ram 30 is connected to the body frame. The connection 31 between the ram 30 and the body frame has its axis fixed and centered with respect to the latter; but the connection between the cylinder and the sub-frame is detachable and capable of being located at either side of the sub-frame. For this purpose a clevis 32 is fixed to each side member 19 of the sub-frame and a removable pin 33 passes through the legs of the selected clevis and a web 34 projecting from the closed end of the cylinder. The clevises 32 are directly opposite one another and so located with respect to the pivotal connection 31 between the ram and the body frame that to gain the most effective utilization of the hydraulic motor, its cylinder should be connected to the clevis at the side of the sub-frame away from which the body frame moves as it is swung to the selected diagonal position. With the cylinder thus positioned, projection of the ram swings the body frame away from its centered transport position and retraction of the ram brings the body frame back to its centered position.

Figure 6:
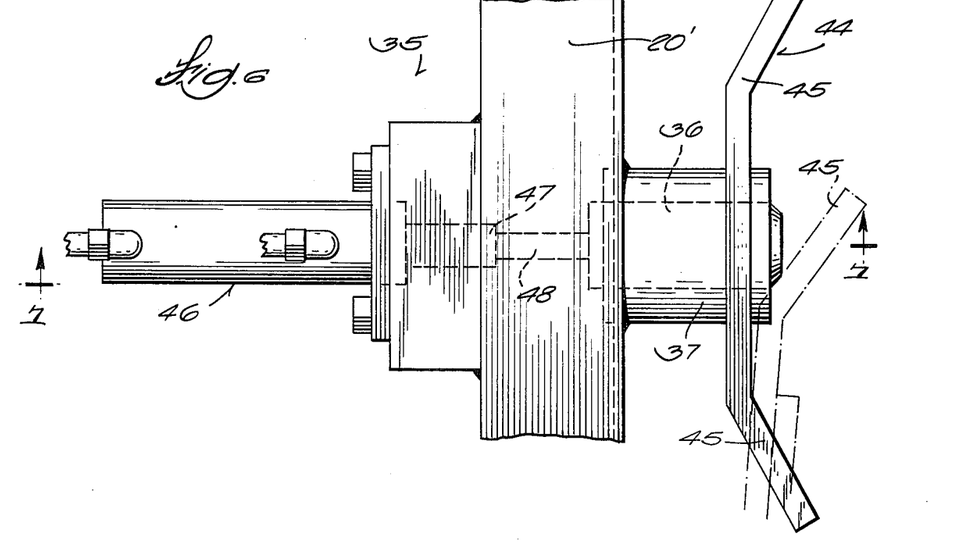
FIG. 6 is an enlarged top view (with parts broken away and in section) of the locking pin assembly by which the body frame is held in its transport position.
Figure 7:
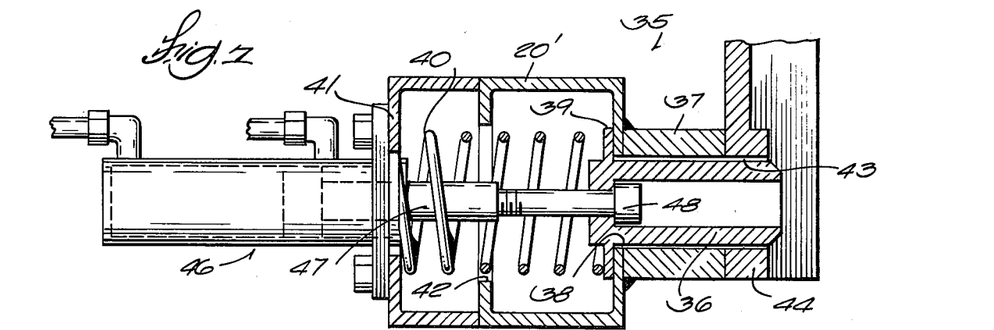
FIG. 7 is a vertical sectional view through the locking pin assembly on the plane of the line 7—7 in FIG. 6.
Figure 8:
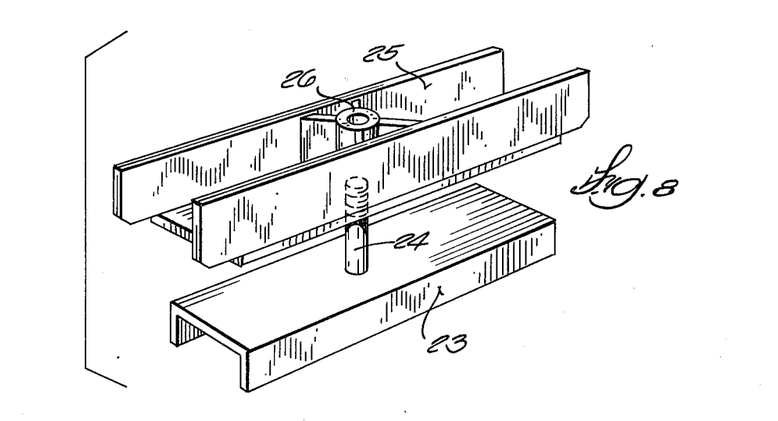
FIG. 8 is an exploded perspective view of the pivot assembly that connects the body frame and sub-frame.

When the body frame is in its centered transport position, it should be "locked" in that position. That function is performed by a locking pin assembly, designated generally by the numeral 35 and located on the centerline of the sub-frame at the rear thereof. As best shown in FIGS. 6 and 7, the locking pin assembly comprises a cylindrical pin 36 slidably mounted in a tubular guide 37 that is welded to and projects rearwardly from the rearmost cross member 20' of the sub-frame in a line with a hole 38 through its rear wall. A flange 39 that is larger in diameter than the hole 38, on the inner end of the pin 36, is yieldingly held seated on the inner face of the rear wall of the cross member 20' by a compression spring 40 confined between the flange and the web of a cylinder mounting channel 41 that has its flanges welded to the front wall of the rearmost cross member 20', this front wall having a hole 42 to accommodate the spring. The spring 40 thus projects the locking pin from its tubular guide 37 and into a hole 43 in a bracket 44 that is fixed to the rear of the body frame on the longitudinal center thereof when the body frame is in its centered transport position.

To effect automatic engagement of the locking pin in the hole 43 as the body frame is returned to its centered transport position from either of the diagonal positions, the bracket 44 has a pair of ramps 45 flanking the hole 43, which — upon engaging the locking pin during the final stages of the return of the body frame to its centered transport position — depress the pin and hold it depressed until the hole 43 comes into alignment with the pin, whereupon the spring 40 snaps the pin into the hole to secure the body frame against unintentional displacement from its centered transport position.

To free the body frame for movement to either of its diagonal positions, a hydraulic cylinder 46 that is mounted on the channel 41 and has its ram 47 connected to the pin, is activated. The connection between the locking pin and the ram 47 is effected by threading a cap screw 48 into the exposed end of the ram, the headed end of the cap screw being received in a deep counterbore in the pin.

Figure 9:
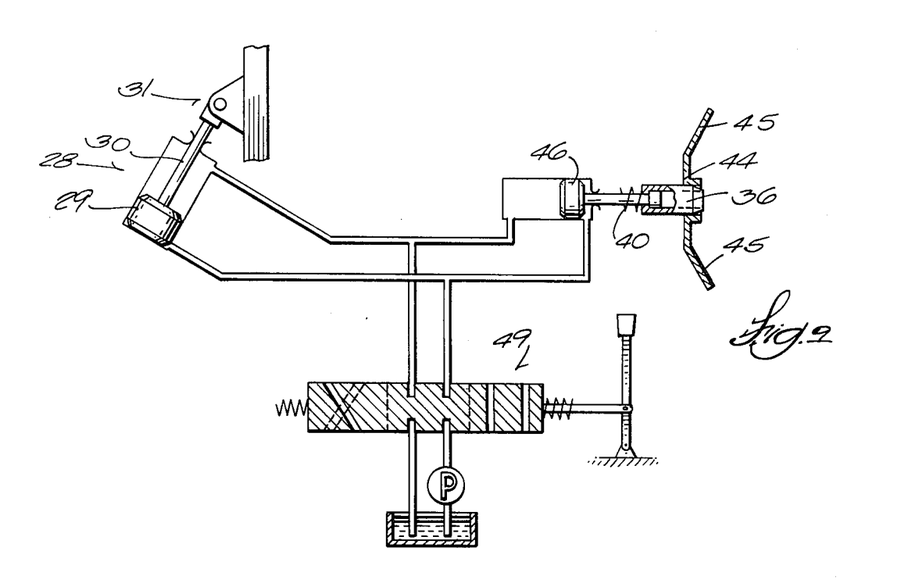
FIG. 9 is a hydraulic diagram showing the interconnection of the body swinging cylinder and the locking pin control cylinder.

As shown in FIG. 9, the double-acting cylinder 29 by which the body frame is swung back and forth and the locking pin retracting cylinder 46 are connectable with a source of hydraulic pressure through control valve means 49 in such a way that the locking pin is retracted before the body frame begins to move out of its centered transport position, and is projected to its operative position before the body frame returns to its transport position. Projection of the ram 47, of course frees the spring of the restraint that had been imposed thereon by the cylinder. The control valve means 49 can be placed in the cab of the truck for actuation by the driver.

Since the connection between the ram and the pin is unidirectional and capable of transmitting only tension forces, that connection does not interfere with depression of the locking pin by an approaching ramp 45, so that reactivation of the locking pin assembly is effected automatically.

An important aspect of this invention resides in the fact that the sub-frame is of skeletonized construction. As a result, its upwardly facing surfaces upon which the body sets — although collectively defining a relatively large area of support for the body frame — are individually narrow and widely spaced. Therefore, as the body frame is swung about its pivotal connection with the sub-frame, the interface between the contacting surfaces changes and, in so doing, effectively cleans those surfaces to assure a relatively free-sliding engagement despite the abrasive environment that characterizes concrete handling operations.

Figure 10:
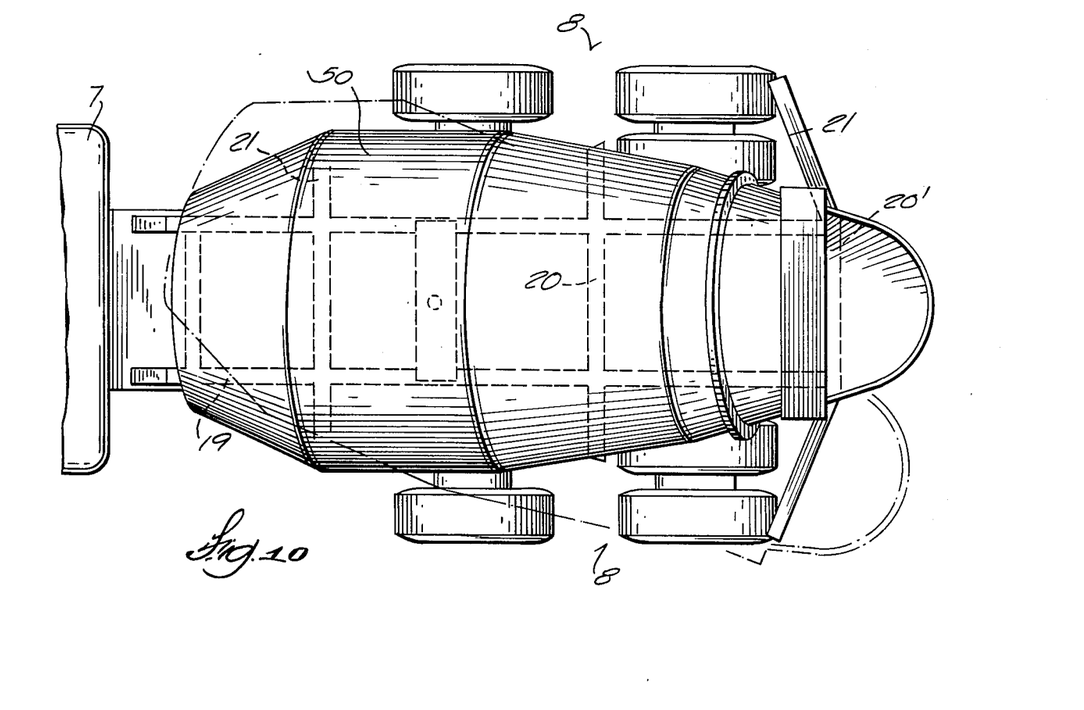
FIG. 10 is a top view of a conventional truck mixer embodying this invention.

Although as noted hereinbefore, this invention is especially well adapted to use with the Agitor-type of concrete hauling vehicle, it can also increase the lateral reach of the conventional truck mixer in which the contents of the drum are discharged by reversing the direction of its rotation. Thus as diagrammatically depicted in FIG. 10, by mounting the truck mixer body 50 on a sub-frame in the manner described for the Agitor-type body, the discharge point of the mixer can be shifted a significant distance to either side of the centerline of the vehicle.

Those skilled in the art will appreciate that the invention can be embodied in forms other than as herein disclosed for purposes of illustration.

For instance, if for some reason it is found desirable to discharge the contents of the body in a generally forward direction, as in the Maxon, Jr., U.S. Pat. No. 3,667,738, that objective can be met with very little reorientation of the structure by which the body frame 13 is pivotally mounted. In another possible adaptation of the invention, the elements of the sub-frame 18 could be incorporated in the chassis of the vehicle; and, of course, the transport vehicle on which the body is mounted could be a railroad flat car.

The invention is defined by the following claims:

1. In a material transporting vehicle of the type having a chassis and a body especially designed to hold a sizable volume of material to be transported, mounted on a body frame having parallel sides and front and rear ends, the body having a discharge mouth at one end thereof, and means mounting the body frame with the body thereon on the chassis of the vehicle in a manner that enables the discharge mouth of the body to be directed to either side of the chassis without substantially shifting the center of gravity of the loaded body with respect to the chassis, said means comprising:
   A. rigid supporting structure fixed with respect to the chassis, said structure including cantilevered arms that project laterally beyond the sides of the chassis at spaced intervals along the length thereof, said cantilevered arms as well as the rest of said rigid structure having coplanar top surfaces;
   B. the body frame having a bottom surface all portions of which lie in a common plane and slidably set upon the coplanar top surfaces of said rigid structure;
   C. pivot means connecting the body frame with said rigid supporting structure, the axis of said pivot means being fixed with respect to said rigid supporting structure and normal to the plane of the slidably engaged surfaces of the body frame and rigid supporting structure and substantially intersecting the center of gravity of the body; and
   D. power means reacting between the body frame and the chassis, operable to swing the body frame about the axis of said pivot means from a transport position parallel with the sides of the chassis to either a right or left diagonally disposed position, in each of which the discharge mouth of the body is spaced laterally a substantial distance from the centerline of the vehicle chassis and in each of which the body frame is solidly supported by said rigid supporting structure.

2. The material transporting vehicle of claim 1, wherein said rigid supporting structure is a skeletonized frame whereby the coplanar top surfaces thereof upon which the body frame sets, although collectively defining a relatively large area, are individually narrow and widely spaced, so that as the body frame is swung about the axis of said pivot means, different portions of the coplanar top surfaces of the rigid supporting means are engaged by the bottom surface of the body frame.

3. The material transporting vehicle of claim 1, wherein the chassis includes parallel side rails, and further characterized in that said rigid structure is a unitary rigid sub-frame having elongated parallel members spaced apart substantially the same distance as are the parallel side rails of the vehicle chassis and held in said spaced relation by cross members fixed thereto,
   the cantilevered arms projecting from and being fixed to said elongated parallel members,
and means securing said elongated parallel members of the sub-frame to the side rails of the chassis.

4. The material transporting vehicle of claim 3 wherein said pivot means comprises:
   A. a beam having its ends fixed to the elongated parallel members of the rigid sub-frame and having a top surface that is coplanar with the members that collectively form said sub-frame;
   B. a pin anchored to said beam and projecting vertically upward from its top surface;
   C. a bridging member that forms part of the body frame and has a bottom surface seated on the top surface of said beam; and
   D. bearing means fixed to said bridging member and in which said pin is journaled.

5. The material transporting vehicle of claim 4, wherein said power means comprises
   a fluid pressure motor having a cylinder member and a ram member,
   means pivotally connecting one of said members of the fluid pressure motor to a fixed point on the rigid sub-frame, and
   means pivotally connecting the other one of said members of the fluid pressure motor to a fixed point on the body frame.

6. The material transporting vehicle of claim 5, wherein said fixed point on the body frame is at its front end and substantially equispaced between the sides of the body frame, and wherein said means forming said pivotal connection between the rigid sub-frame and its respective member of the fluid pressure motor comprises
   1. a pair of shackles, one fixed to each of the elongated parallel members of the sub-frame near the front end thereof, 2. an apertured web projecting from said respective one of said members of the fluid pressure motor receivable between the arms of either of said shackles, and 3. a removable pin to connect said apertured web with a selected one of said shackles.

7. The material transporting vehicle of claim 3, further characterized by releasable latch means reacting between said frames and operative to secure the body frame in its transport position.

8. The material transporting vehicle of claim 5, wherein said fluid pressure motor is a double-acting cylinder, and further characterized by:

A. means for selectively pressurizing the opposite ends of said double-acting cylinder to thereby selectively effect movement of the body frame from and back to its transport position;

B. releasable latch means arranged to react between the body frame and the sub-frame to secure the body frame in its transport position;

C. means for effecting automatic engagement of said latch means concomitantly with movement of the body frame to its transport position;

D. fluid pressure responsive control means for said latch means by which the latch means can be disengaged to free the body frame for movement from its transport position; and E. means for pressurizing said control means to effect disengagement of the latch means and thereby free the body frame for movement out of its transport position.

9. The material transporting vehicle of claim 8, further characterized by means for so controlling communication of said fluid pressure responsive control means and said double-acting cylinder with a source of fluid pressure that disengagement of the latch means occurs before initiation of movement of the body frame out of its transport position and upon return of the body frame to its transport position said latch means is free for automatic engagement.

10. The material transporting vehicle of claim 9, wherein said latch means comprises:

A. a pin slidably mounted on the sub-frame for movement to and from a defined projected position;

B. a spring reacting between the pin and the sub-frame to yieldingly urge the pin to its projected position;

C. a keeper on the body frame to receive the pin;

D. ramp means on the body frame to depress the pin for entry into the keeper during the final phase of the return of the body frame to its transport position; and E. wherein said fluid pressure responsive control means comprises:

1. a cylinder mounted on the sub-frame, and 2. a ram operating in said cylinder and having a unidirectional motion imparting connection with the pin to retract the pin from the keeper upon energization of said cylinder.

11. In a material transporting and placing vehicle of the type having a chassis which includes parallel side rails, and a body especially designed to hold a sizable volume of concrete, mounted on a body frame having parallel sides and front and rear ends, the body having front and rear ends with a discharge mouth at one end thereof, and means mounting the body frame with the body thereon on the chassis of the vehicle in a manner that enables the discharge mouth of the body to be directed to either side of the chassis without substantially shifting the center of gravity of the loaded body with respect to the chassis, said means comprising:

A. a rigid sub-frame having front and rear ends and formed of elongated parallel side members spaced apart substantially the same distance as are the parallel side rails of the vehicle chassis, and cross members connecting said elongated parallel side members at spaced intervals along the length thereof, certain of said cross members having end portions that project beyond the parallel side members, each of said members that collectively form the rigid sub-frame having a top surface, and all of said top surfaces lying in a common plane;

B. means securing the elongated parallel side members of said rigid sub-frame to the top of the parallel side rails of the vehicle chassis, the body frame having a bottom surface all portions of which lie in a common plane and slidably seat upon the coplanar top surfaces of the members that collectively form said rigid sub-frame;

C. pivot means connecting said body frame with said sub-frame, with the axis of the pivot vertical and substantially intersecting the center of gravity of the body; and D. power means reacting between said frames and operable to slide the body frame about the axis of said pivot means from a transport position in which its sides are parallel with the side rails of the chassis to either a right or left diagonally disposed position, in each of which the discharge mouth of the body is spaced laterally a substantial distance beyond the centerline of the vehicle chassis and the body frame is solidly supported by the rigid sub-frame.

* * * * *